United States Patent [19]

Mears

[11] 4,128,128
[45] Dec. 5, 1978

[54] DIAPHRAGM ACTUATED SPRINKLER HEAD

[75] Inventor: James W. Mears, Warwick, R.I.

[73] Assignee: Grinnell Fire Protection Systems Company, Inc., Providence, R.I.

[21] Appl. No.: 810,068

[22] Filed: Jun. 27, 1977

[51] Int. Cl.² .............................................. A62C 37/20
[52] U.S. Cl. ..................................... 169/37; 251/61.2
[58] Field of Search ...................................... 169/37–41; 251/25, 61.2, 61.5; 137/79

[56] References Cited

U.S. PATENT DOCUMENTS

| Re. 29,155 | 3/1977 | Mears et al. | 169/37 |
|---|---|---|---|
| 2,230,179 | 1/1941 | Cid | 169/37 |
| 3,749,176 | 7/1973 | Grenier | 169/37 |
| 3,757,866 | 11/1971 | Mears et al. | 169/37 |
| 3,791,450 | 2/1974 | Poitras | 169/37 |
| 3,812,914 | 5/1974 | Mears | 169/37 X |

OTHER PUBLICATIONS

Skinner Electric Valves–General Catalog V66, Skinner Electric Valve Division, New Britain, Ct, pp. 6.1–6.11.
Humphrey Air Control Specialists–Catalog 75, Humphrey Products, Kalamazoo, Michigan, pp. 46, 52, 55.

Primary Examiner—Evon C. Blunk
Assistant Examiner—Andres Kashnikow

[57] ABSTRACT

A pilot operated sprinkler head comprises a two part housing having an annular diaphragm extending across a chamber between the housing parts, the diaphragm being sealed to a hollow bore main valve member and sealed to the chamber; one side of the diaphragm is exposed to the discharge of a pilot valve assembly for actuating the main valve member when the pilot valve is open; and a drain passage of restricted size to the atmosphere is provided between the housing and the main valve member, sized to insure proper pressure on the diaphragm to actuate the main valve member with the pilot valve open, the drain passage draining water from the diaphragm when the pilot valve is closed to permit the diaphragm and the main valve member to return to their original positions. The drain passage is shown in the form of an annular clearance around the valve member. The valve member is shown with hollow bore axially aligned with the inlet, and telescopically movable about a stationary strainer. The valve member is biased closed with a strong spring which is overcome by the action of water pressure on a large diaphragm area, the latter being vented on its opposite side.

15 Claims, 4 Drawing Figures

DIAPHRAGM ACTUATED SPRINKLER HEAD

This invention relates to automatic sprinkler heads especially adapted for use in fire protection systems.

It is a principal object of the present invention to provide a sprinkler which is reliable in operation even at low system pressures. It is a further object to provide a sprinkler which despite its operability at low pressures nevertheless remains closed except under predetermined operating conditions. It is yet a further object to provide a sprinkler of simple design which has minimal susceptibility to malfunction due to exposure of critical parts to corrosion or to impurities in water.

In general the invention features a sprinkler head comprising a main valve member and a pilot valve assembly for actuating the main valve member. The main valve member is a hollow bore element engaged upon a valve seat. An annular flexible diaphragm in the sprinkler head extends between and is sealed to the sprinkler head and the main valve member. One side of the diaphragm is exposed to water pressure when the pilot valve is open for moving the main valve member away from the valve seat. The one side of the diaphragm is also connected to atmosphere through a restricted drain passage sized to insure proper pressure on the diaphragm when the pilot valve assembly is open. A vent in the sprinkler head also exposes the other side of the diaphragm to atmosphere.

In preferred embodiments biasing means urges the valve member toward the valve seat and the diaphragm is arranged to move the valve member away from the valve seat when the pilot valve assembly is open. The hollow bore of the main valve member is axially aligned with a main water inlet passage in the sprinkler and a branch water passage leading to the pilot valve assembly is connected to the side of the main inlet passage. The drain passage is an annular passage about the main valve member and is sealed, when the pilot valve assembly is closed, by the diaphragm which is urged thereagainst by biasing means. The main valve member reciprocates freely through the clearance provided by the drain passage. An annular strainer extends across the branch passage and about which the main valve member moves telescopically.

In a particular embodiment, the sprinker comprises a two part housing. The main inlet and branch passages are provided in a first housing part. The second housing part defines with the first housing part a chamber and includes a control passage communicating with the branch passage. A valve seat, axially aligned with the main inlet, extends across and is spaced from an aperture in the wall of the second housing part, the main valve member extending from the valve seat to the inlet and axially moveable away from the valve seat. Biasing means in the chamber urges the main valve member toward the valve seat. The diaphragm is sealed between the housing parts and is positioned between the biasing means and a discharge opening from the control passage. The pilot valve assembly is connected to the branch and control passages to control the passage of water therethrough to the diaphragm.

Other objects, features and advantages of the invention will be apparent to those skilled in the art from the following detailed description of a preferred embodiment taken together with the accompanying drawings, in which.

Figure 1:
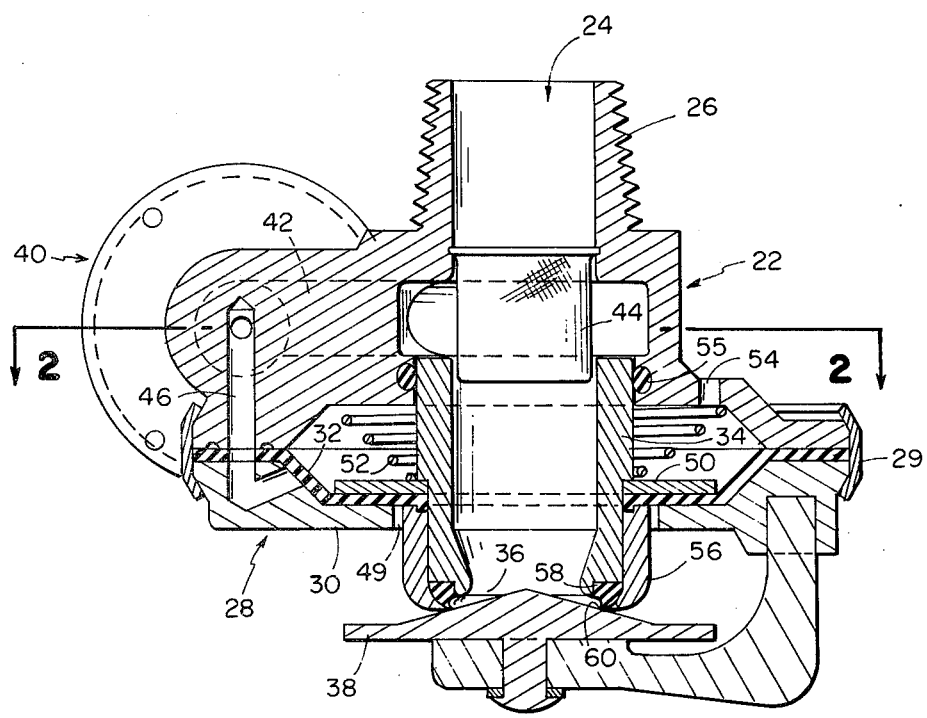
FIG. 1 is a side elevation in section of a sprinkler embodying the invention.

Referring to FIG. 1 of the drawings, the sprinkler head comprises a two part housing, the first or upper part 22 having main inlet passage 24 defined by nipple 26 for continued pressurization of the sprinkler by water in the system. The second or lower housing part 28 comprises a wall 30 spaced from the upper housing part 22 and defining a chamber therebetween. An annular flexible diaphragm 32 extending across the chamber is peripherally secured between the housing parts 22, 28 which are joined by a crimped band 29. A main valve member 34, extending through wall 30, has a through bore communicating at one end with the inlet passage 24 and defining at its other end an outlet 36, shown in FIG. 1, sealed on the deflector 38 of the sprinkler assembly, the deflector also functioning as a valve seat. The main valve member 34 is axially moveable away from deflector 38 to allow water to pass through the inlet passage 24 and through the bore of valve member 34 and then to strike deflector 38 and fall as a fire-protection spray.

Figure 2:
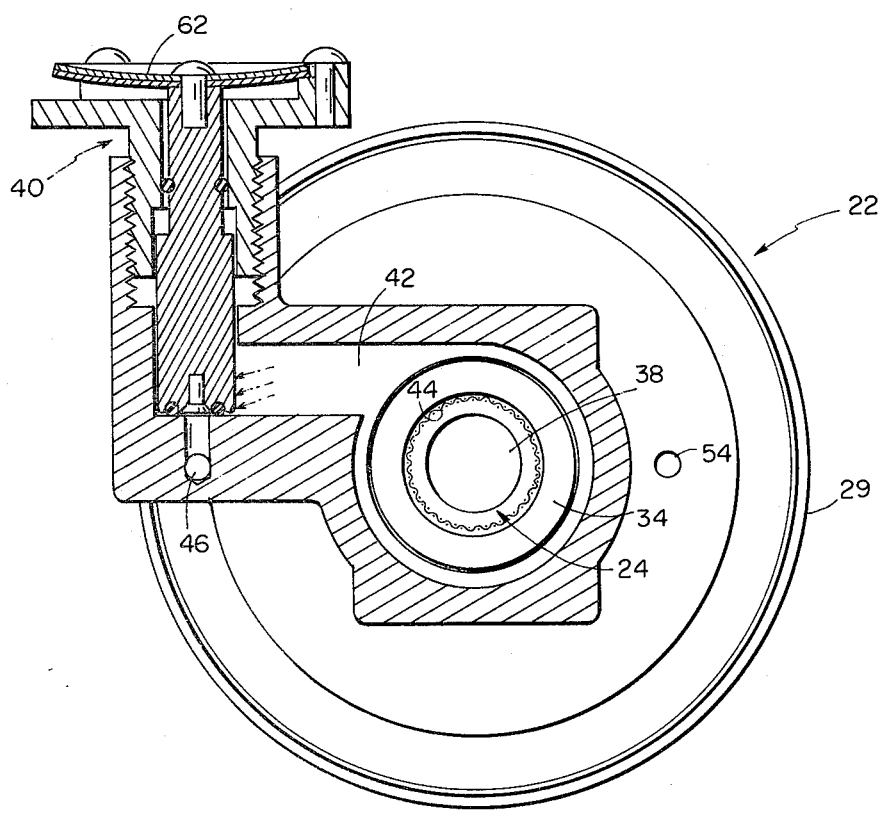
FIG. 2 is a view taken along the line 2—2 of FIG. 1 particularly illustrating the pilot valve assembly in the sprinkler.
Figure 3:
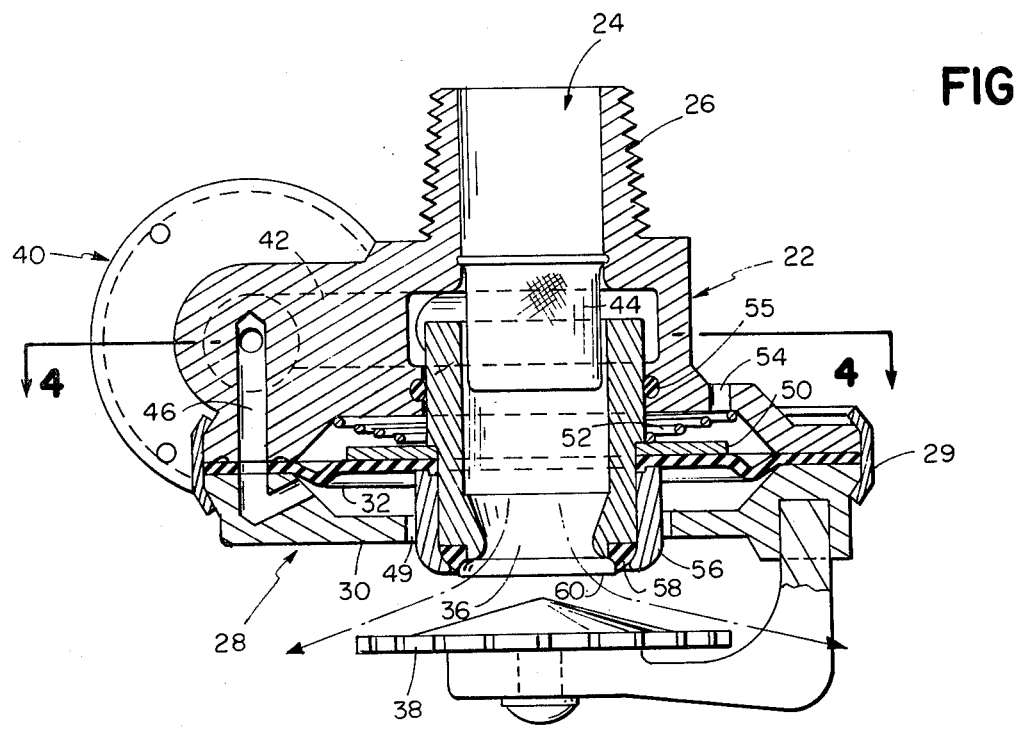
FIG. 3 is a view similar to that of FIG. 1 with the main valve member open.
Figure 4:
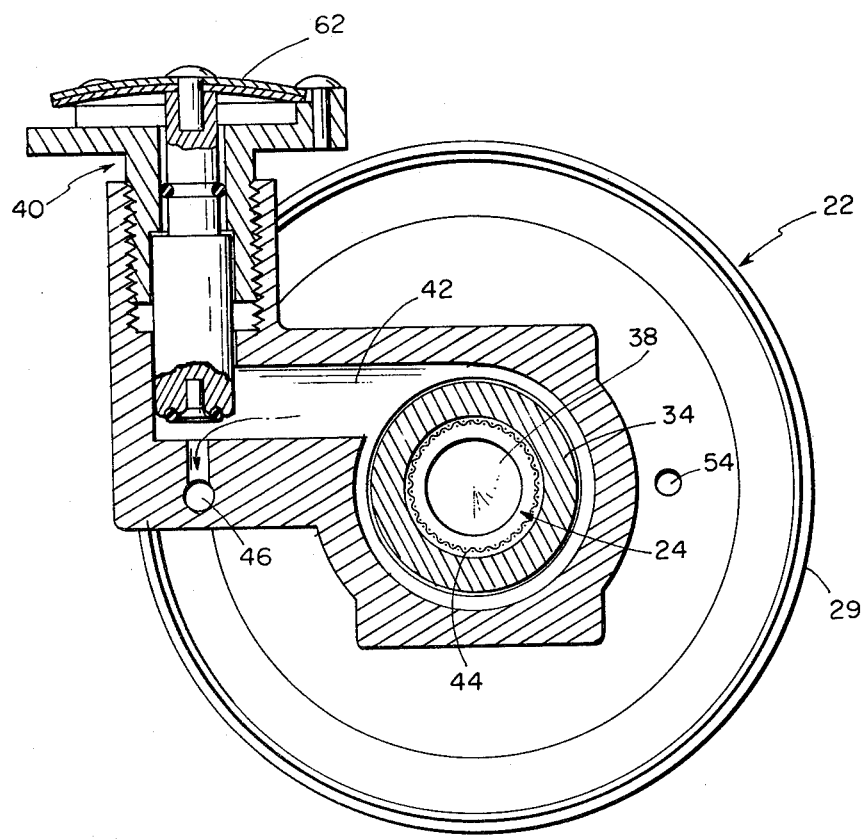
FIG. 4 is a view similar to that of FIG. 2 taken along the line 4—4 of FIG. 3 with the pilot valve open.

The sprinkler head is operated by a pilot valve assembly 40, shown in FIG. 2, which may be identical to the pilot assembly shown in U.S. Pat. No. 3,757,866, now U.S. Pat. No. RE 29,155. Water pressure is continuously communicated to the pilot assembly 40 by a branch water passage 42 extending from the side of inlet passage 24, a strainer 44 interposed between the inlet and branch passages 24, 42. A control water passage 46 extends from the pilot assembly 40 through the lower housing part 28 to the underside of diaphragm 32, between the diaphragm 32 and wall 30. Upon actuation of the pilot assembly to open pilot valve 48, as shown in FIG. 4, water pressure is communicated through the branch and control passages 42, 46 to the underside of diaphragm 32, thus raising main valve member 34 to actuate the sprinkler, as shown in FIG. 3, the pilot valve pressure overcoming the force of spring 52.

A restricted drainage passage 49, in the form of an annular clearance, is provided between main valve member 34 and wall 30 at the aperture in wall 30 through which the main valve member 34 extends. Drain passage 49 connects the underside of diphragm 32 to atmosphere and permits water from the pilot assembly to be discharged from between the diaphragm 32 and wall 30 thereby permitting return of the diaphragm when the pilot assembly is closed. Drain passage 49 is deliberately kept small to insure proper upstream pressure to operate the diaphragm when the pilot assembly is open. Thus, with an overall one inch diameter of valve member 34, a water supply pressure of 40 p.s.i. and a flow rate through the pilot assembly of about 1 gallon per minute, drain passage 49 in the illustrated embodiment defines a clearance of 0.003–0.004 inches between main valve member 34 and wall 30.

In the chamber space between the diaphragm 32 and the upper housing part 22 a flange or washer 50 engages the diaphragm 32. Spring 52 bears against the washer 50 and the upper housing part 22, biasing the main valve member into sealing engagement with the deflector 38.

Vent 54 exposes the upper side of diaphragm 32 to atmosphere and permits movement of the diaphragm 32 without air compression in the space above the diaphragm. With the pilot valve 48 closed, therefore, the diaphragm is exposed to atmosphere on both sides, through drain 49 and vent 54, and is controlled by spring 52 to seal the drain 49.

An O-ring seal 55 in the upper housing part 22 extends above the main valve member 34 at inlet passage 24 to seal the chamber above diaphragm 32 from water in the sprinkler head.

Below the diaphragm, retainer 56 is secured by press fit to main valve member 34 and bears against the diaphragm 32, sealing it against washer 50. Retainer 56 also secures an annular seal 58 at the outlet of main valve 34, seal 58 having a continuous lip 60 adapted to bear against deflector 38 and to respond to water pressure to insure a water tight seal against the deflector 38 when the main valve member 34 is closed.

As illustrated, the cylindrical strainer 44 is telescoped within inlet passage 24 and extends into the bore of main valve member 34, which reciprocates about it. The strainer 44 is spaced about 0.005" from the bore of valve member 34. This arrangement excludes unstrained water from all parts of the sprinkler head, including the pilot assembly and seal 55, except the inlet and main valve member.

In operation, the sprinkler head normally has its valves closed as illustrated in FIGS. 1 and 2. Water is admitted through the inlet passage 24 into the bore of main valve member 34 and through branch passage 42 to pilot valve assembly 40. Spring 52 urges the main valve member 34 to its closed position against deflector 38, water pressure on the lip 60 of seal 38 assuring a water tight seal. In the event of fire, thermal responsive bimetallic disc 62 operates to open the pilot valve assembly 40, as illustrated in FIG. 4. Water pressure is then admitted under diaphragm 32, lifting main valve member 34 away from deflector 38 to open the sprinkler head and to discharge water to protect against the fire, as shown in FIG. 3. During this actuation some water escapes from below the diaphragm through drainage passage 49, but owing to the restricted nature of the passage, sufficient upstream pressure is preserved to actuate the diaphragm.

Upon the return of normal temperatures, disc 62 closes the pilot valve assembly 40, water under diaphragm 32 drains through passage 49 and spring 52 returns main valve member 34 to its closed position against deflector 38.

Advantageously, the main flow of water through the sprinkler head in a straight unrestricted path minimizes resistance and permits operation even at low system pressures, e.g., 5 p.s.i. Further, the use of a diaphragm of large area, as illustrated, provides sufficient force for operation at such low pressures even when a heavy spring is employed. Such a spring strongly biases the main valve member closed to ensure sealing at low water pressures during filling or even under vacuum when draining. The diaphragm serves also to seal the drain passage which in turn allows free reciprocation of the valve member without the restraint of any additional peripheral seal. No internal seals are exposed to unstrained water and no check valves or other critical small clearance passages are exposed continuously to deposits from the water or to the corrosive effects of water, thus minimizing the potential causes of malfunction.

Other embodiments of this invention will occur to those skilled in the art which are within the scope of the following claims.

What is claimed is:

1. A fire protection sprinkler head, comprising a main valve member engaged upon a valve seat and a pilot valve assembly adapted to actuate said main valve member, characterized in that:

said main valve member comprises a hollow bore element;

an annular flexible diaphragm is positioned within the chamber formed by said sprinkler head, extending between and sealed to said main valve member and said chamber;

one side of said diaphragm is exposed to said pilot valve assembly and water pressure therefrom, said side being connected to atmosphere through a flow-restrictive drainage passage sized to insure actuating pressure on the diaphragm to displace the main valve member away from said valve seat when the pilot valve assembly is open; and a vent in said chamber exposing the other side of said diaphragm to atmosphere;

whereby the position of the main valve member is controlled by the diaphragm action in response to the pilot valve.

2. The sprinkler head claimed in claim 1 further characterized in that said drainage passage comprises an annular passage extending about said main valve member between said member and said valve assembly.

3. The sprinkler head claimed in claim 1 further characterized in that said valve seat for said main valve member lies at the end thereof on said one side of said diaphragm and biasing means urges said main valve member toward said valve seat, said main valve member axially movable away from and toward said valve seat.

4. The sprinkler head claimed in claim 1 further characterized in comprising a main water inlet passage, said hollow bore of said main valve member axially aligned with said inlet passage.

5. The sprinkler head claimed in claim 4 further characterized in comprising a branch water passage connected to the side of said main inlet passage and leading to said pilot valve assembly.

6. The sprinkler head claimed in claim 5 further characterized in comprising an annular strainer secured in said main inlet extending across said branch passage.

7. The sprinkler head claimed in claim 6 further characterized in that said strainer extends into said main valve member in telescoping relation therewith.

8. The sprinkler head claimed in claim 1 further characterized in that said diaphragm is positioned against said drainage passage in sealing engagement therewith when said pilot valve assembly is closed.

9. The sprinkler head claimed in claim 8 further characterized in that biasing means urges said diaphragm against said drainage passage, said water pressure moving said diaphragm away from said passage when said pilot valve assembly is open.

10. A fire protection sprinkler head comprising a housing, a main valve member and a pilot valve assembly characterized in that:

said housing comprises a first housing part having a main water inlet passage extending therethrough to a second housing part and a branch water passage extending from the side of said inlet passage through said first housing part;

said second housing part including a wall defining a chamber between said first and second housing parts, said wall having an aperture axially aligned with said main inlet passage, and said second housing part including a control water passage in communication with said branch water passage, said control passage having a discharge opening into said chamber;

a valve seat extending across and spaced away from said wall aperture;

said main valve member comprises a hollow bore element extending axially from said valve seat through said aperture to said inlet passage and axially moveable in said inlet passage away from said valve seat;

biasing means in said chamber urging said main valve member toward said valve seat;

a flexible annular diaphragm extending across said chamber sealed to said main valve member and peripherally sealed between said housing parts, said diaphragm positioned between said biasing means and said control passage discharge opening for moving said main valve member away from said valve seat in response to water pressure emanating from said control passage;

a vent in said chamber admitting atmosphere to the side of said diaphragm opposite said control passage discharge opening;

a pilot valve assembly connected to said branch and control passages for controlling the passage of water therethrough; and a drainage passage between said wall aperture in said second housing part and said main valve member connecting said diaphragm to atmosphere and sized to insure proper pressure on said diaphragm to displace said main valve member when said pilot valve is open.

11. The sprinkler head claimed in claim 10 further characterized in comprising an annular strainer secured in said main inlet extending across said branch passage.

12. The sprinkler head claimed in claim 11 further characterized in that said strainer extends into said main valve member therewith.

13. The sprinkler head claimed in claim 10 further characterized in that said drainage passage comprises an annular passage extending about said main valve member.

14. The sprinkler head claimed in claim 13 further characterized in that said biasing means urges said diaphragm into sealing engagement with said drainage passage when said pilot valve is closed.

15. A fire protection sprinkler head comprising a housing, a main valve member, a valve seat, and a pilot valve assembly characterized in that:

said valve seat comprises a stationary element external of said housing;

said main valve member comprises a hollow bore element extending through said housing for sealing engagement upon said valve seat and is axially moveable within said passage away from said valve seat;

diaphragm means connected to said main valve member responsive to water pressure emanating from said pilot valve when said pilot valve is open to move said main valve member away from said valve seat; and a flow restrictive drainage passage for water from said pilot valve when said pilot valve is open, said drainage passage comprising a narrow annular clearance between said housing and said main valve member, through which said axially moveable main valve member extends to said valve seat.

* * * * *